United States Patent
Hombrecher

[15] 3,697,724
[45] Oct. 10, 1972

[54] ELECTRIC SOLDERING IRON WITH ADJUSTABLE THERMOSTATIC TEMPERATURE CONTROL

[72] Inventor: Friedrich Hombrecher, Wertheim/Main, Germany

[73] Assignee: Ersa Ernst Sachs K.G., Wertheim/Main, Germany

[22] Filed: May 26, 1970

[21] Appl. No.: 40,532

[30] Foreign Application Priority Data

June 11, 1969 Germany..........P 19 29 938.8

[52] U.S. Cl. ..................219/241, 219/239, 219/512, 337/394, 337/398
[51] Int. Cl. .......H05b 1/02, B23k 3/04, H01h 37/46
[58] Field of Search.....................219/221–242, 512; 337/384, 386, 388, 394, 398–400

[56] References Cited

UNITED STATES PATENTS

| | | | |
|---|---|---|---|
| 2,479,587 | 8/1949 | Morris et al. | 219/512 |
| 2,475,376 | 7/1949 | Darling | 219/241 |

FOREIGN PATENTS OR APPLICATIONS

| | | | |
|---|---|---|---|
| 663,214 | 12/1951 | Great Britain | 219/241 |
| 829,567 | 3/1960 | Great Britain | 219/241 |
| 1,044,948 | 10/1966 | Great Britain | 219/241 |

Primary Examiner—A. Bartis
Attorney—McGlew and Toren

[57] ABSTRACT

An electric soldering iron has a hollow handle connected to an outer tube in which there is a heating element operatively associated with a soldering tip and including a heating core fixed at the front end of the outer tube. A rod having a very low coefficient of thermal expansion is secured to the inner end of the heating core and extends into the hollow handle. A microswitch is oscillatably mounted in a unit in the hollow handle, and a pivotally mounted angle lever is also oscillatably mounted in the hollow handle and has a longer arm cooperable with the plunger of the microswitch. The shorter arm of this angle lever is engaged by the rod. The temperature setting of the soldering iron may be changed by adjustment of a screw, accessible from the exterior of the handle, and operative both on the microswitch and on the lever. The longer arm of the lever carries an abutment which is engageable with the microswitch at a point spaced substantially from the oscillating axis of the microswitch. In an alternative embodiment, adjustment of the temperature setting is effected by relative rotation of a handle element threaded onto the handle and cooperable with a temperature setting scale.

10 Claims, 4 Drawing Figures

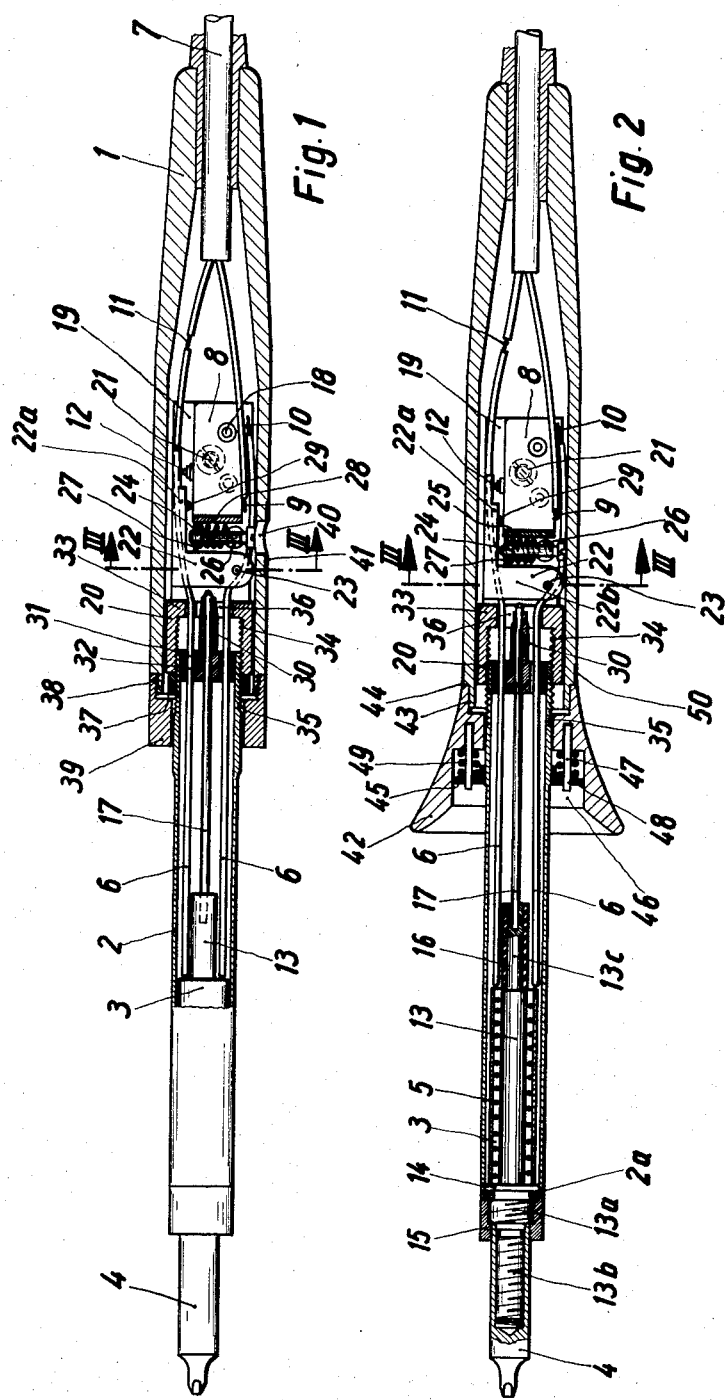

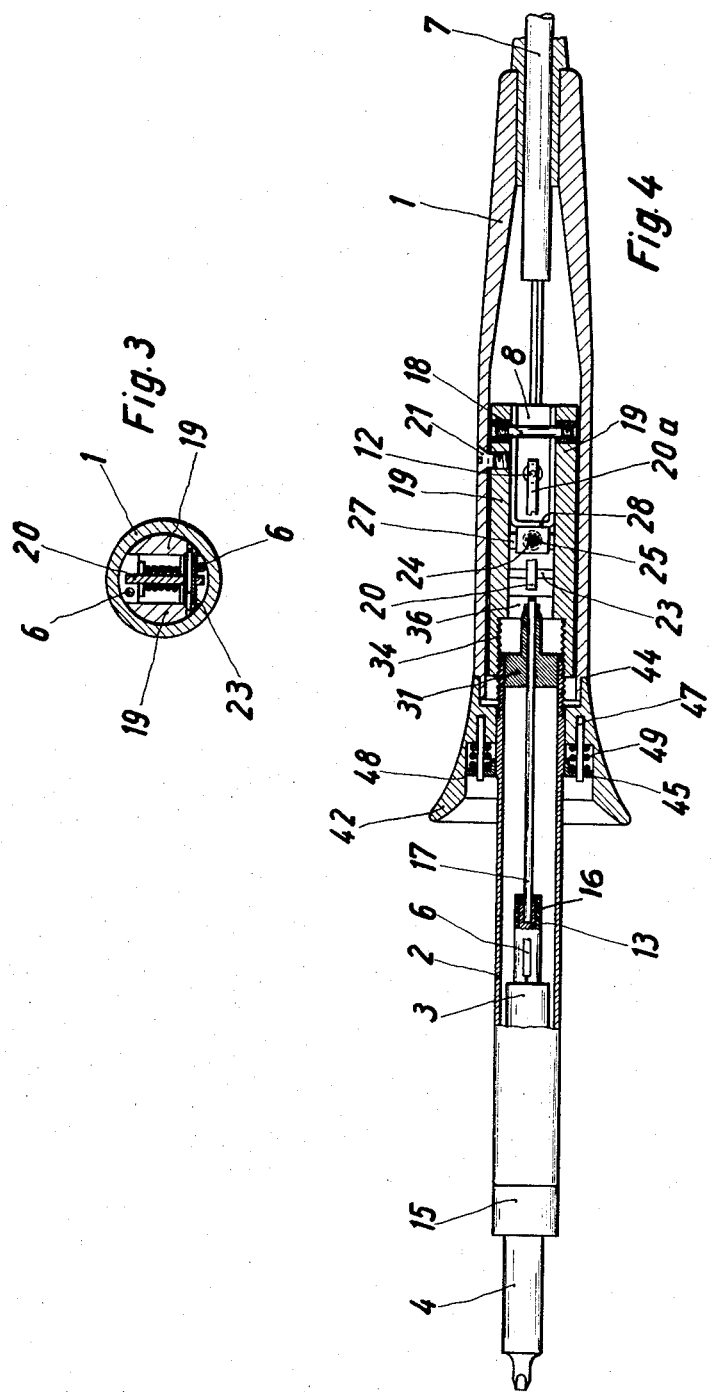

3,697,724

ELECTRIC SOLDERING IRON WITH ADJUSTABLE THERMOSTATIC TEMPERATURE CONTROL

BACKGROUND OF THE INVENTION

In electric soldering irons not having a temperature control, there is a disadvantage that the soldering temperature drops sharply from the original temperature of the soldering iron, with rapid soldering sequences. Another disadvantage is that the soldering tip can be overheated in an idle run. In temperature-controlled electric soldering irons, a certain overdimensioning of the filament power is possible and desirable in every respect.

There are known electric soldering irons with temperature regulators whose temperature-sensitive element is a ferromagnetic body whose magnetic transition point, known as the Curie point, is so set by a suitable selection of an alloy, that it is at the desired cut-off temperature. When the Curie point is attained, the ferromagnetic property of the temperature-sensitive element is lost abruptly, so that a switching mechanism can be actuated to cut off the heating current for the heating element of the soldering iron.

This known regulation utilizing the Curie point has the disadvantage that it can be designed only for a certain temperature, since the alloy of the temperature-sensitive element is determinant, for the cut-off temperature. On the other hand, a thermostatic temperature control utilizing the expansion of a temperature-sensitive substance has the advantage that it can be set to different cut-off temperatures.

In a known electric soldering iron of this latter type, the thermal expansion of a heating core, surrounded by a heating element arranged in an outer tube, and which expansion takes place only in one direction, is transmitted by a rod which does not expand with increase in temperature. The force transmitted by the rod is transferred to an angle lever and, through the angle lever, to a microswitch arranged in a hollow handle and whose switching point can be set by an adjusting screw to a certain soldering temperature, this adjusting screw operating against the bias of the compression spring. An arrangement of this type is shown in British Pat. No. 663,214. The setting of the electric soldering iron to a certain cut-off temperature has been effected, heretofore, during the assembly of the soldering iron by the manufacturer. A subsequent change of the temperature setting by the user of the soldering iron is neither provided for nor is readily possible, since the soldering iron would have to be partly disassembled for this purpose. In addition, the cut-off temperature of a heated soldering iron could be set in only one direction, namely for higher temperatures, since the distance between the free end of the operating rod and the angle lever engaged thereby would have to be increased. Any adjustment in the opposite direction, in the sense of a lower cut-off temperature, is not possible since the required play is missing. If necessary, the setting of a lower cut-off temperature could be effected only in the cold state of the soldering iron, and this requires, however, the above-mentioned partial disassembly of the soldering iron. The prerequisites for a resetting of the cut-off temperature of the electric soldering iron cannot be expected of the normal user. The known soldering irons with a temperature control therefore are provided only for a certain cut-off temperature which is already set at the factory.

Despite this, in today's complicated soldering practice, it can happen that the electric soldering iron in use must be used for various solderings, for example, when changing from normal solderings to those of temperature-sensitive elements and vice versa.

SUMMARY OF THE INVENTION

This invention relates to electric soldering irons and, more particularly, to an electric soldering iron having an adjustable thermostatic temperature control which can be set to any desired temperature, within a given range, without disassembling the soldering iron and while the soldering iron is either heated or is cold.

In accordance with the invention, the means for setting the temperature can be actuated from outside the soldering iron, and the temperature can be set both in the cold state and in the heated state of the soldering iron, in either direction. It is thus possible to set the required operating temperature of the electric soldering iron according to temperature degrees, while working with the soldering iron. A preferred embodiment of the invention uses a commercial microswitch which has, in a known manner, on its narrow longer side a plunger actuating the switching mechanism. This microswitch is pivotally and elastically mounted on a shaft, and its housing is engaged by an additional cam on the angle lever for actuating the microswitch. This angle lever retains the microswitch, during the resetting of the temperature in the heated state, in the swung-out position for the time necessary until it attains the coefficient of expansion of the heating core corresponding to the lowest temperature.

The elastically and pivotally mounted microswitch prevents bending of the operating linkage between the heating core and the microswitch when the heated electric soldering iron is set to a lower temperature, and thus makes available the necessary play for restting the temperature in the heated state. This also prevents any possible damage to the largely sensitive switching mechanism in the microswitch. The adjustment of the microswitch, with respect to the switching point, is maintained for each temperature setting. The accuracy of the disconnection and reconnection of the heating current is equally good within the entire temperature control range.

The yielding movement of the microswitch and of the switching operation must be adapted to each other. To this end, the cam on the longer arm of the angle lever actuating the plunger is arranged, in accordance with another feature of the invention, in advance of the plunger and at a point spaced further than the plunger from the oscillation axis of the microswitch. The ratio of these lever arms assures a trouble-free operation during each temperature setting operation.

Preferably, the angle lever is arranged with its shorter or cross arm spaced from the broad side of the microswitch and, in this space, there are arranged the adjusting screw having the compression spring, both of which engage a lug connected with the microswitch. This lug has a threaded hole for the adjusting screw, and the compression spring bears against the lug which, inturn, bears against a guide pin having an opening for the adjusting screw. This space-saving arrangement of the control mechanism is particularly favorable for electric soldering irons whose hollow handle need not be larger than heretofore provided. A particular advantage is the short length of the control insert, which is due to the transverse arrangement of the adjusting screw and the return spring surrounding the adjusting screw, in the space between the microswitch and the angle lever.

The overall assembly is substantially simplified by the fact that the microswitch is surrounded laterally by an open U-shaped sheet metal cover, on whose broad side the lug is bent off or soldered at the level of the top edge of the microswitch.

In order further to simplify the assembly, the latter can be effected outside of the soldering iron. To this end, the microswitch, the angle lever, and the adjusting screw can be arranged between the arms of a U-shaped insert whose front part has a fine female thread into which the outer tube can be screwed with a corresponding thread, and whose intermediate bottom or partition has openings for the rod and for the leads to the heating element. This ready-mounted insert is inserted into the hollow handle sleeve and retained therein by a screw. The plug assembly is extremely simple, and the insert protects the fittings against damage during assembly.

In accordance with the preferred embodiment of the invention, the temperature-setting is effected utilizing a fine thread of the outer tube, by rotary adjustment of a handle element connected non-rotatably with the outer tube, This handle element is guided on a reduced or neck portion of the handle, and bears against a step or shoulder of the latter during the setting. The outer contour of the handle extends, without a break, into the contour of the front handle element, and the outwardly uninterrupted handle unit contour exists in any temperature setting. The handle part, increasing in size toward the soldering tip, facilitates, by its larger radius, the temperature setting, for which a temperature scale is arranged next to the step on the circumference of the handle.

The elastic bearing of the front rotatable handle element on the step is attained in a simple manner by securing, on the outer tube, a flange which is engaged by pins of the rotatable handle element. These pins carry compression springs that engage the inner surface of the flange and the bottom of a recess in the handle element in which the flange is mounted for axial displacement.

The adjusting screw, which is now enclosed in the handle, is not accessible from the outside. It need not be, because the temperature setting is effected by the front handle element. The angle of rotation over the entire temperature setting range comprises only a fraction of one revolution, so that the leads to the heating element do not hinder the angular adjustment of the front handle element.

In a simplified embodiment, the front handle element is eliminated and the adjusting screw is arranged transversely in the handle and can be adjusted from the outside. To this end, the outer tube can be locked in the fine thread of the insert by a check nut after adjustment, the adjusting screw in the handle having a passage extending coaxially thereto and around which is arranged a temperature scale. The basic structure of the electric soldering iron, with its switching mechanism contained in the handle, is the same in this embodiment as in the one previously mentioned.

An object of the invention is to provide an improved electric soldering iron having a temperature setting adjustment means which is accessible at all times and which can be used when the soldering iron is either in the heated stage or the cold state.

Another object of the invention is to provide such an electric soldering iron in which an abutment on one arm of an angle lever engages an oscillatably mounted microswitch to provide play for adjusting the temperature setting in either direction.

A further object of the invention is to provide such an electric soldering iron in which the microswitch and associated parts are pre-mounted in an insert which is inserted into the soldering iron assembly.

Another object of the invention is to provide such an electric soldering iron which is simple in construction, inexpensive to manufacture, and rugged in use.

For an understanding of the principles of the invention, reference is made to the following description of typical embodiments thereof as illustrated in the accompanying drawings:

BRIEF DESCRIPTION OF THE DRAWINGS

In the drawings:

FIG. 1 is a longitudinal sectional view, partly in elevation, of one embodiment of soldering iron in accordance with the invention;

FIG. 2 is a view similar to FIG. 1 of an embodiment of the invention using a rotatable front handle element for temperature setting adjustment;

FIG. 3 is a transverse sectional view along the lines III—III of FIGS. 1 and 2, and FIG. 4 is a longitudinal sectional view through the soldering iron of FIG. 2, taken in a plane at right angles to that of FIG. 2, and with the front end of the outer tube and the soldering tip being shown in elevation.

DESCRIPTION OF THE PREFERRED EMBODIMENTS

Referring to the drawings, the electric soldering iron includes a hollow handle 1, an outer tube, or stem tube, 2, a heating element 3 arranged within tube 2, and a soldering tip 4 in operative association with heating element 3. Heating element 3 has a heating winding 5 to which a potential is applied over insulated lead wires 6. Outer cord 7 is connected with lead wires 6 through a microswitch 8 having terminals 9 and 10. The lead wire 6 bypassing microswitch 8 is connected with cord 7 at junction 11.

Microswitch 8 has an operating plunger 12 on its upper narrow longitudinal edge, and this plunger is actuated responsive to thermal expansion of a heating core 13 arranged in electrically insulated relation inside heating element 3. Core 13 can expand thermally in only one direction, namely, in the direction toward microswitch 8. The surface of heating core 13 is corrosion-resistant. Thus, the surface can be alited and nickel-plated. This surface treatment assures longitudinal expansion of heating core 13 inside heating element 3. Heating core 13 has a flange 14 adjacent its front end engaging the inturned end 2a of outer tube 2, and core 13 is retained against movement by a retaining nut 15 threaded onto a threaded lug 13a of the heating core and providing a passage for soldering tip 4.

Soldering tip 4 has a female thread by means of which it is threaded onto a threaded pin 13b of heating element 3. At its opposite end, heating core 13, beyond heating element 3, is reduced in diameter as at 13c, and an insulating sleeve 16 is slipped over part 13c. A thin rod 17 is soldered onto the inner end of heating core 13, and transmits thermal expansion of core 13 to microswitch 8.

Outer tube 2 and rod 17 are formed of a material having a very low thermal coefficient of expansion, such as, for example, a nickel-steel alloy known under the trade name "Invar." Since heating core 13 is fixed to the outer end of outer tube 2, which is not subject to thermal expansion, the expansion of core 13 occurs in only one direction so that it is utilized fully for the switching operation.

Microswitch 8 is eleastically and oscillatably mounted on a shaft 18 between the sides 19 of an U-shaped insert 20, which latter is inserted into hollow handle 1 during assembly and retained therein by a screw 21. In the same insert 20 there is mounted, in spaced relation to the inner short side of microswitch 8, an angle lever 22. Lever 22 is oscillatable on a shaft 23, and has a longer arm 22a, illustrated horizontally in the drawing, for actuating plunger 12 of microswitch 8. Between the shorter or cross arm 22b of angle lever 22 and the shorter edge of microswitch 8, there is arranged an adjusting screw 24 embraced by a compression spring 25. A guide pin 26 extends between sides 19 of insert 20, and is formed with a diametric passage for adjusting screw 24 while serving, at the same time, as an abutment for compression spring 25 which bears against a lug 27 of microswitch 8. Lug 27 has a threaded aperture in which adjusting screw 24 is threadely engaged. Lug 27 is arranged in an open U-shaped sheet iron cover 28 laterally embracing microswitch 8. Lug 27 is bent off, or soldered on, the wider side of cover 28 approximately at the level of the upper edge of microswitch 8 as viewed in the drawing.

The longer arm 22a of angle lever 22 carries an additional cam or abutment 29 which engages the upper edge of microswitch 8 in spaced relation inwardly of plunger 12. Shaft 18 is further from cam or abutment 29 than is plunger 12.

Rod 17 engages cross arm 22b of angle lever 22 when heating core 13 expands, in the heated state of the soldering iron. In the cold state, rod 17 is at an adjustable distance directly in front of cross arm 22b. Rod 17 passes through a guide sleeve 30 of a closure 31 inserted into the inner end of outer tube 2, and closure 31 has openings 32 for leads 6.

An intermediate closure or partition 33 is provided in insert 20 and interconnects sides 19. On the opposite side, or in the front part of insert 20, there is formed a fine female thread 34 which is threadedly engageable with a male thread 35 on the inner end of outer tube 2. The partition 33 of insert 20 is formed with openings for rod 17 and leads 6. Instead of several openings, a single larger opening is provided, in the embodiment of FIG. 2, and is indicated at 36.

The regulator arrangement as so far described pertains to both embodiments of the invention, so that only the additional features of the two embodiments are described hereinafter. Thus, the temperature-controlled electric soldering iron shown in FIG. 1 has a fixed thread length in outer tube 2 to be screwed into insert 20. After adjustment of the small spacing between rod 17 and cross arm 22b of angle lever 22, the threaded length is maintained by a check nut 37. Handle 1 has, on its front end, a male thread 38 on which is screwed a retaining nut 39 having a corresponding female thread. Retaining nut 39 is formed with a narrow passage for the reinforced or thickened portion at the inner end of outer tube 2. Retaining nut 39 covers check nut 37, which is thus secured against accidental movement.

In the simpler embodiment of the invention shown in FIG. 1, adjusting screw 24, arranged inside handle 1, is used for adjusting the temperature setting. A passage 40 is arranged in handle 1 coaxially with adjusting screw 24, and a temperature scale 41 is arranged, on the surface of handle 1, around aperture 40. The aperture 40 is larger than the head of adjusting screw 24, and the slot or kerf of the head of screw 24 is used as an indicating mark for the temperature setting.

In the embodiment of the invention shown in FIGS. 2 and 4, the adjustment of the temperature setting is effected by a front handle element 42 which is connected non-rotatably with outer tube 2 and which is guided on a reduced portion 43 of handle 1 and bears elastically against a shoulder 44 terminating the reduced portion 43. For this purpose, a flange 45 is secured on outer tube 2, as by soldering thereto. Flange 45 is axially displaceable in a recess 46 of front handle element 42 and is non-rotatably connected with front handle element 42 by pins 47 extending through apertures 48 in flange 45. These pins are secured in the bottom of the recess 46 of the handle element, and are embraced by compression springs 49 which engage the inner surface of flange 45 and the bottom of recess 46. Springs 49 press front handle element 42 against shoulder or step 44.

Adjustment of the temperature setting is effected by angular adjustment of front handle element 42, which screws outer tube 2 into the fine thread 34 of insert 20. In this embodiment of the invention, adjusting screw 24 is fully enclosed. Temperature scale 50 is arranged directly adjacent step or shoulder 44, on the exterior surface of handle 1. The angular temperature adjustment over the entire temperature setting range, from about 250° to 400°C, is about 150°C, and the range of angular movement is limited by a correspondingly large recess in the rear handle part and a stop pin in the front handle part.

Both embodiments of the invention have, in common, that the angle lever 22 is engaged by rod 17 in a thermal expansion of heating core 13, so that the additional cam or abutment 29 turns the housing of microswitch 8 more or less downwardly during simultaneous engagement of longer arm 22a with plunger 12. Due to the difference between the lever arms, the switching mechanism of microswitch 8 is still actuated, for which the differential movement at the switching point is determinant.

By virtue of the oscillating support of microswitch 8, the microswitch can yield laterally through cam or abutment 29, for example, when temperature is reset in the heated stated of the soldering iron, from 400° to 250°C, for example. This prevents bending of rod 17 as well as mechanical destruction of microswitch 8. The additional cam or abutment 29 retains the elastic microswitch during the resetting to a lower temperature so long, until setting of angle lever 22 for the new temperature is attained by the decreased expansion of heating core 13. Setting of the temperature to higher values is readily possible since the spacing between rod 17 and angle lever 22 is increased.

While the specific embodiments of the invention have been shown and described in detail to illustrate the application of the principles of the invention, it will be understood that the invention may be embodied otherwise without departing from such principles.

What is claimed is:

1. In an electric soldering iron with adjustable thermostatic temperature control, of the type including a microswitch arranged in a hollow handle, a heating core, in an outer tube secured to the handle and having a zero coefficient of expansion, and surrounded by a heating element, the outer tube supporting the heating core for expansion only toward the handle, a rod secured to the heating core and having substantially a zero coefficient of thermal expansion, an oscillatable angle lever engageable by the rod to operate the microswitch, and an adjustable screw, opposed by a compression spring, operable to set the switching point of the microswitch to correspond to a preselected soldering temperature: the improvement comprising said microswitch being pivotally mounted in said handle; and temperature setting means actuable from the exterior of soldering iron and operable to adjust the position of one of said microswitch and said outer tube relative to said angle lever, to adjust the temperature setting in both directions in both the cold state and the heated state of the soldering iron.

2. In an electric soldering iron with adjustable thermostatic temperature control, of the type including a microswitch arranged in a hollow handle, a heating core, in an outer tube secured to the handle and having a zero coefficient of expansion, and surrounded by a heating element, the outer tube supporting the heating core for expansion only toward the handle, a rod secured to the heating core and having substantially a zero coefficient of thermal expansion, an oscillatable angle lever engageable by the rod to operate the microswitch, and an adjustable screw, opposed by a compression spring, operable to set the switching point of the microswitch to correspond to a preselected soldering temperature: the improvement comprising said microswitch being pivotally mounted in said handle; and temperature setting means actuable from the exterior of soldering iron and operable to adjust the position of one of said microswitch and said outer tube relative to said angle lever, to adjust the temperature setting in both directions in both the cold state and the heated state of the soldering iron; said microswitch including a housing having a narrow elongated edge on which there is arranged an operating plunger for the switching mechanism; a shaft elastically and oscillatably mounting said microswitch housing; said angle lever having a short arm engageable by said rod and a long arm cooperable with said plunger to operate said switching mechanism; and an abutment on the longer arm of said angle lever engageable with said microswitch housing; said abutment on said angle lever retaining said microswitch in its swung-out position during resetting of the temperature in the heated state of said soldering iron until the expansion length of said heating core has a value corresponding to the lowest temperature setting.

3. In an electric soldering iron, the improvement claimed in claim 2, in which said abutment is positioned on said longer arm of said angle lever at a spacing from said shaft greater than the spacing of said plunger from said shaft.

4. In an electric soldering iron, the improvement claimed in claim 2, in which said microswitch housing has a shorter edge; said angle lever being oscillatably mounted with its shorter arm spaced from said shorter edge; said adjusting screw and said compression spring being arranged in the space between said shorter arm and said shorter side of said housing; a lug connected with said microswitch and having a threaded aperture; said adjusting screw being threaded into said threaded aperture and said compression spring bearing, at one end, against said lug; and a guide pin having an opening for said adjusting screw and bearing against the opposite end of said compression spring.

5. In an electric soldering iron, the improvement claimed in claim 4, including an open U-shaped sheet iron cover laterally embracing said microswitch and carrying said lug at the level of said longer edge of said microswitch housing.

6. In an electric soldering iron, the improvement claimed in claim 4, including an U-shaped insert between the arms of which said microswitch, said angle lever and said adjusting screw are mounted; the forward end of said insert having a fine female thread engageable by a fine male thread on said outer tube; said insert having an intermediate partition formed with an opening for said rod and for electric leads connected to said heating element.

7. In an electric soldering iron, the improvement claimed in claim 6, in which the temperature setting is effected by said fine thread; a front handle element non-rotatably connected with said outer tube to thread said outer tube relative to said insert; the inner end of said hollow handle being formed with a reduced portion on which said front handle element is rotatably mounted, said reduced portion having a shoulder; and means elastically pressing said front handle element against said shoulder.

8. In an electric soldering iron, the improvement claimed in claim 7, including a flange fixedly mounted on said outer tube; said front handle element having a recess receiving said flange; pins on said front handle element slidable through apertures in said flange; said flange being axially displaceable in said recess; and compression springs surrounding said pins and engaged between said flange and the bottom of said recess.

9. In an electric soldering iron, the improvement claimed in claim 8, including a temperature scale on the exterior surface of said handle adjacent said shoulder cooperating with indicia on said front handle element.

10. In an electric soldering iron, the improvement claimed in claim 6, including a check nut operable to lock said outer tube to said insert after adjustment; said adjusting screw being accessible through an aperture in said handle coaxially with said adjusting screw; and a temperature scale extending around the periphery of said aperture cooperating with the kerf of said screw.

* * * * *